United States Patent [19]

Ohno et al.

[11] Patent Number: 5,449,196
[45] Date of Patent: Sep. 12, 1995

[54] PAD FOR AIR BAG

[75] Inventors: Satoshi Ohno; Michio Inoue; Tadashi Yamamoto, all of Aichi, Japan

[73] Assignee: Toyoda Gosei Co., Ltd., Nishikasugai, Japan

[21] Appl. No.: 115,773

[22] Filed: Sep. 3, 1993

[30] Foreign Application Priority Data

Sep. 25, 1992 [JP] Japan .................. 4-256946

[51] Int. Cl.⁶ .............................................. B60R 21/16
[52] U.S. Cl. .................................................. 280/728.3
[58] Field of Search .......................... 280/728 B, 731

[56] References Cited

U.S. PATENT DOCUMENTS

| 5,002,307 | 3/1991 | Heirdorn | 280/731 |
| 5,056,814 | 10/1991 | Shiraki et al. | 280/731 |
| 5,069,477 | 12/1991 | Shiraki | 280/731 |
| 5,217,250 | 6/1993 | Sakata | 280/731 |
| 5,335,938 | 8/1994 | Koide | 280/728 B |

FOREIGN PATENT DOCUMENTS

| 63-199149 | 8/1988 | Japan . | |
| 0095547 | 3/1992 | Japan | 280/728 B |

Primary Examiner—Margaret A. Focarino
Assistant Examiner—Paul N. Dickson
Attorney, Agent, or Firm—Cushman Darby & Cushman

[57] ABSTRACT

A pad for an air bag comprises an outer covering including an upper wall part, hinge portions disposed at a periphery of the upper wall part, and side wall parts extending from the hinge portions. The side wall parts together with the upper wall part and the hinge portions of the outer covering are adapted to substantially confine the air bag when the air bag is in an uninflated condition. The upper wall part is conditionable to permit the airbag to escape the confines of the outer covering in response to an inflation of the air bag. The pad also includes a synthetic resin insert having a base part, collar parts, and lid parts respectively embedded in the side wall parts, the hinge portions, and the upper wall part of the outer covering. The collar part couples the base part with the lid parts. The hinge portions and the respective collar parts embedded therein are bendable to permit the air bag to escape the confines of the pad when the upper wall part is conditioned to permit the airbag to escape the confines of said outer covering in response to the inflation of the air bag. At least one of the collar parts has a smoothly curved configuration and joins the base part at an inwardly cut portion thereof.

18 Claims, 4 Drawing Sheets

PAD FOR AIR BAG

BACKGROUND OF THE INVENTION

This invention relates to a pad for a safety air bag, which may be installed in the steering wheel of an automobile or the like.

Pads of this type usually include an outer covering layer having an upper wall part covering the upper part of the folded air bag and side wall parts extending downward from the periphery of the upper wall part. The upper wall part is normally provided with a break portion which is severed to release the air bag when the air bag is inflated (see Japanese Patent Unexamined Publication No. 199149/1988).

In the pad disclosed in the above-mentioned publication, the portion at which the upper wall part intersects the side wall parts is designed to function as a hinge that allows the upper wall part to outwardly open in the manner of French doors when the break portion is caused to sever by the inflating air bag. The upper wall part pivots about the hinges so that the air bag can be inflated to its full extent on top of the pad.

The side wall parts, the upper wall part, and the hinge part comprising the outer covering of the pad disclosed in the aforementioned pad is made from a soft synthetic resin. The pad includes an insert which is embedded in the outer covering layer and extends from the side wall parts to the break portion on the upper wall part. This insert includes a base part embedded in the side wall parts, lid parts embedded in the upper wall part, and collar parts embedded in the hinges. The collar parts couple the base part with the lid parts and are thinned relative to the insert so that they can flex to permit the upper wall parts to open.

The insert is normally made from a synthetic resin material, which is harder than the synthetic resin material of the outer covering. However, in order to ensure rigidity, the synthetic resin insert must also be relatively thick. As a result, the upper wall part is unable to fully and properly pivot about the hinges, which are formed about the right-angled collar parts. Thus, the opening speed of the upper wall part is inhibited, causing the upper wall part and air bag to open rather unsmoothly.

Accordingly, it is an object of the present invention to overcome the problems stated above by providing a pad for an air bag which allows the upper wall part to open smoothly and rapidly when the air bag inflates, even though a synthetic resin insert is embedded in the pad.

SUMMARY OF THE INVENTION

To achieve the above object, the present invention provides a pad for an air bag including an outer covering which substantially confines the air bag. The outer covering has an upper wall part, hinge portions disposed at a periphery of the upper wall part, and side wall parts extending from the hinge portions. The upper wall part is conditionable to permit the air bag to escape the confines of the outer covering in response to an inflation of the air bag. A synthetic resin insert is embedded in the outer covering. The insert includes a base part embedded in the side wall parts, lid parts embedded in the upper wall part, and collar parts embedded in the hinges. The collar parts couple the base part to the lid parts. The hinge portions and the collar parts of the insert are bendable to permit the air bag to escape the confines of the pad when the upper wall is conditioned in response to an inflation of the air bag. At least one collar part of the insert has a smoothly curved shape and joins the base part at an inwardly cut portion thereof to enable the pad to open smoothly and rapidly when the air bag is inflated.

The pad according to the above-described invention is designed so that the upper wall part extends upwardly and outwardly about the hinges as the break portion of the upper wall part is broken.

The at least one collar part is designed to be broadly curved so as to have no right-angled bent portion which might otherwise cause stress concentration thereat. The at least one collar can thus bend along a wide area to allow the upper wall part to open and develop smoothly and quickly.

As a result, even if the at least one collar part is relatively thick so as to be sufficiently rigid, and even if the bending angle at discrete positions along the at least one collar part is small, a sufficiently large bending angle of the at least one collar part as a whole can be obtained. In other words, the at least one collar part is smoothly curved, so that rather than pivoting about a straight bend line, the entire one collar bends upwardly and outwardly. This large bending angle of the at least one collar part not only contributes to ensuring that the upper wall part provides a sufficiently large opening, but also prevents the opening speed of the upper wall part from being inhibited.

Therefore, the pad of the air bag according to the present invention allows the upper wall part to develop smoothly when the air bag opens even though the synthetic resin-made insert is embedded therein.

Further, since the pad according to the present invention is designed so that the at least one collar part and respective hinge are curved outwardly of the pad from the side wall parts, a space large enough to contain the air bag therein is ensured.

DETAILED DESCRIPTION OF THE PREFERRED EMBODIMENTS

An embodiment of the present invention will now be described with reference to the accompanying drawings.

Figure 1:
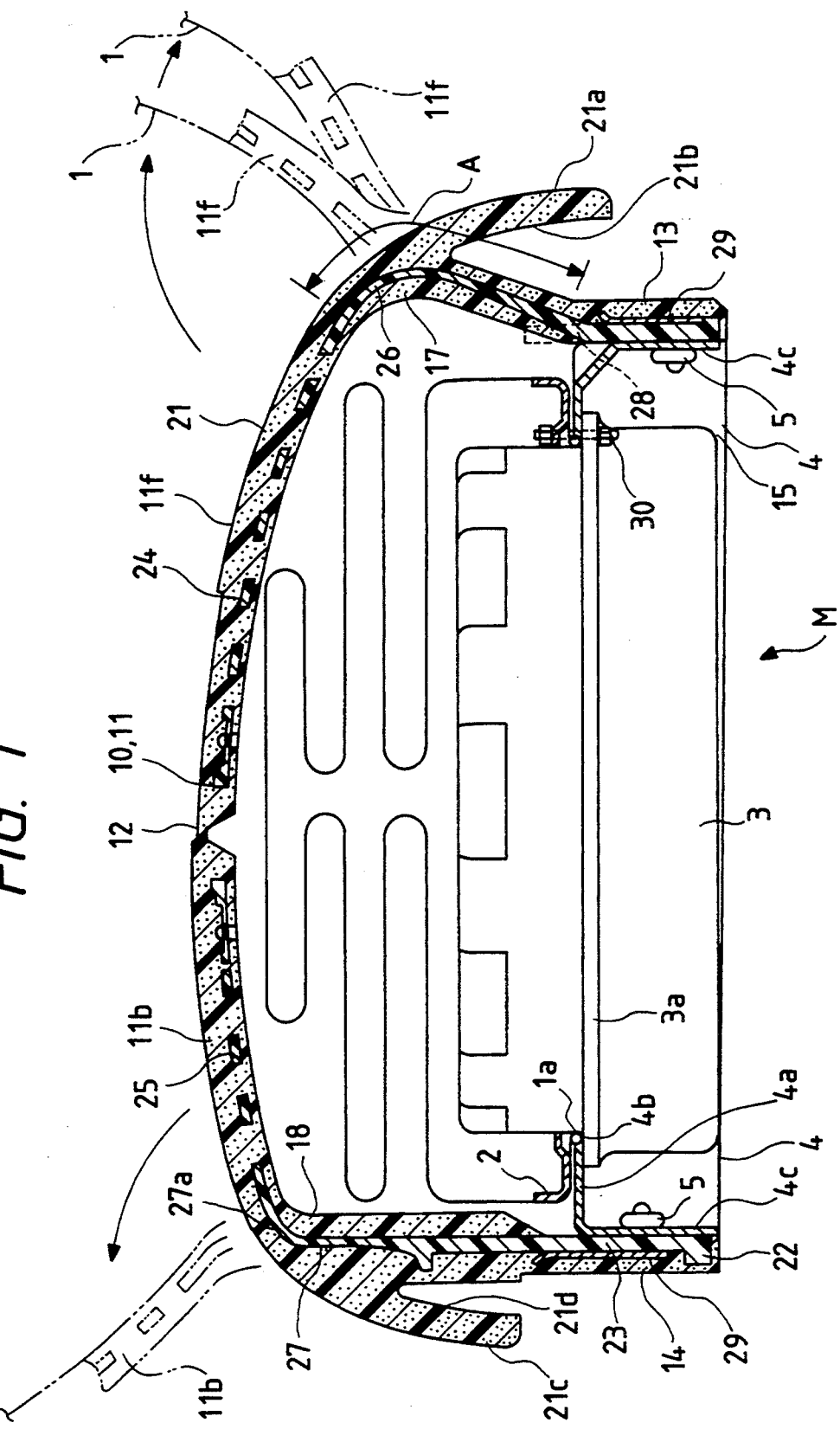
FIG. 1 is a sectional view of an air bag assembly which is provided with the pad of the present invention.

As shown in FIG. 1, a pad 10 is arranged so as to cover the top of an air bag unit M. The air bag unit M is to be installed on top of a boss in the middle of a steering wheel of an automobile.

The air bag unit M includes: a folded air bag 1, the pad 10 for covering the top and sides of the folded air bag 1, an inflator 3 for supplying a predetermined amount of gas to the air bag 1, and a bag holder 4 for holding air bag 1, pad 10, and inflator 3 together.

The bag holder 4 is made of a metal plate, such as steel or aluminum, and includes a substantially rectangular bottom wall 4a having an inserting hole 4b for inserting the top of the inflator 3 in the middle thereof. Bag holder 4 also includes four side walls 4c extending downwardly from the four peripheral sides of the bottom wall 4a (only three of the four walls 4c are shown). Side walls 4c include mounting holes (not shown), which are provided to mount the pad 10. Although also not shown, two of the side walls 4c have a mounting part to which nuts or the like are fused. The nuts allow the assembly to be connected to the steering wheel body.

The air bag 1 is connected to the bag holder 4 by a plate-worked annular retainer 2, which is arranged at the peripheral part of opening 1a at the lower portion of the air bag.

This retainer 2 has a plurality of firmly fixed bolts 30 (only one shown) that project downward at predetermined positions. These bolts 30 are inserted into holes provided on the peripheral part of the opening 1a of the air bag 1, and extend through a flange part 3a of the inflator 3 and the peripheral part of the inserting hole 4b in the bottom wall 4a. The bolts 30 are held in place with nuts so as to hold the air bag 1 and the inflator 3 onto the bag holder 4.

Figure 3:
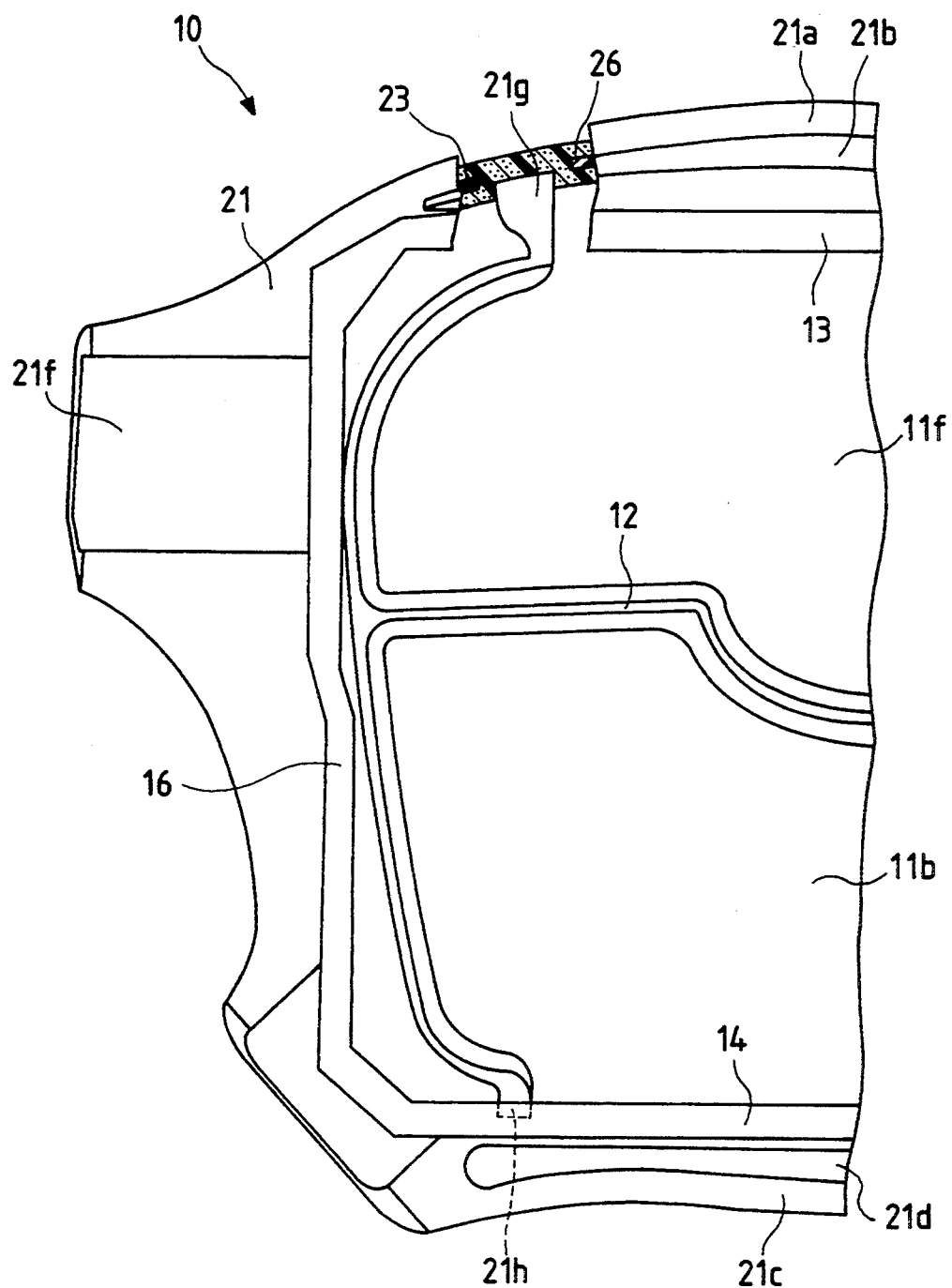
FIG. 3 is a partial bottom view, partly in section, of the pad shown as part of the assembly in FIG. 1.
Figure 4:
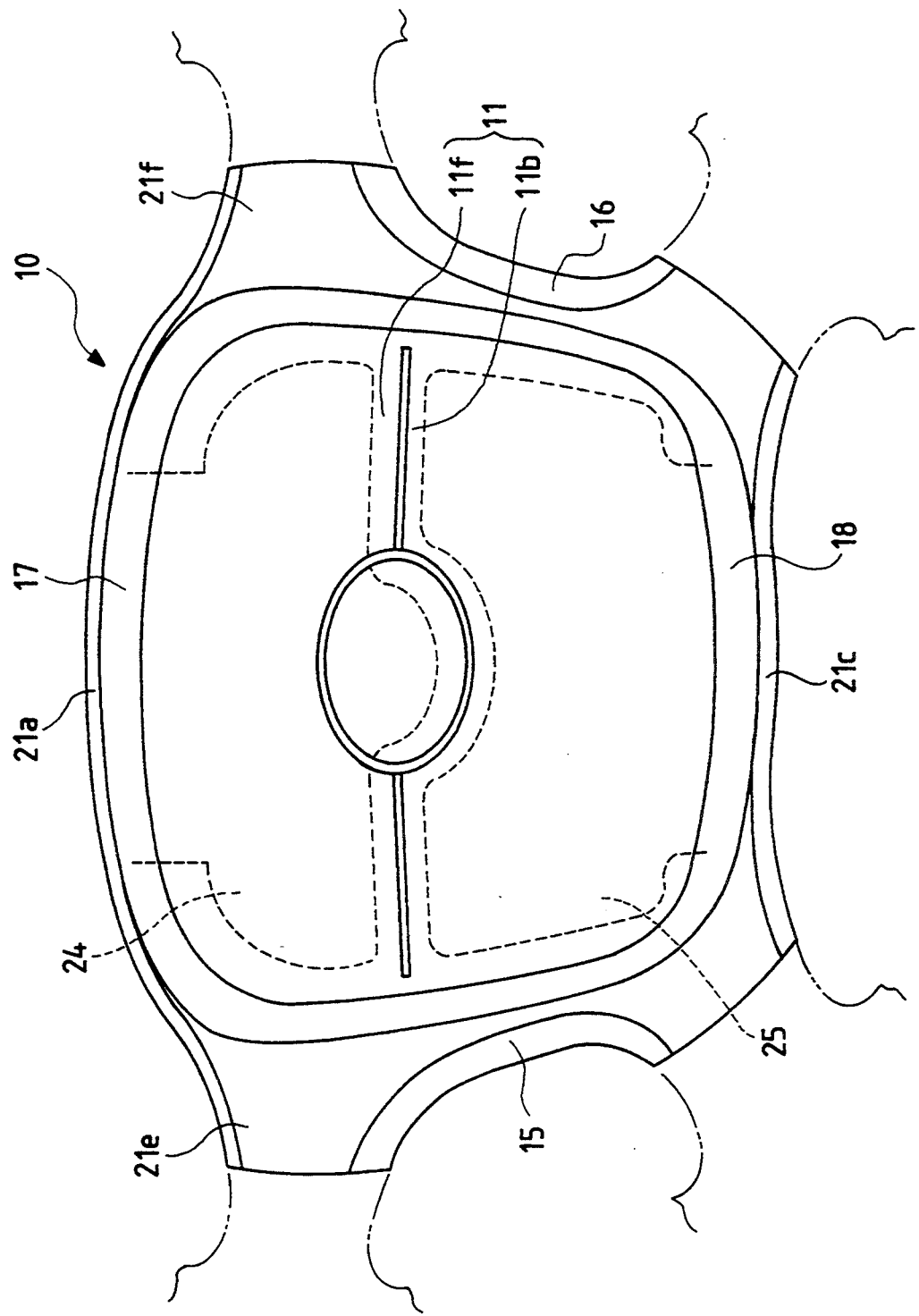
FIG. 4 is a plan view of the pad shown as part of the assembly in FIG. 1.

As shown in FIGS. 1, 3 and 4, the pad 10 includes an outer covering 21 having a substantially rectangular upper wall part 11, and four side wall parts 13, 14, 15 and 16 extending downward from the periphery of the upper wall part 11. The side wall parts 13, 14, 15, and 16 are shaped into a substantially rectangular prism when coupled with each other. The side wall parts together with upper wall part substantially confine air bag 1 therein.

The upper wall part 11 has a break portion 12 which breaks or severs at the time air bag 1 is inflated. This break portion 12 is formed by a thinned portion in covering layer 21 (described later) and is substantially H-shaped when viewed from top. When the break portion 12 breaks to allow the upper wall part 11 to open, a front side upper wall part 11f and a rear side upper wall part 11b open in the manner of French doors. The area of the front side upper wall part 11f is larger than that of the rear side upper wall part 11b.

Pad 10 is designed such that the portions at which the upper wall part 11 intersects the side wall parts 13 and 14, respectively, serve as hinges 17 and 18 that allow the upper wall part 11 to open by the breakage of the break portion 12.

As shown in FIG. 1, hinge 17 forms a wider pivot angle than hinge 18, so that the adjacent covering layer 21 and collar part 26 of an insert 22 can be inflated upwardly and outward of the pad 10 from the side wall part 13 in curved form.

The insert 22 is embedded in the side wall parts 13, 14, 15, 16 and upper side wall 11 of covering layer 21. The covering layer 21 is made of a soft synthetic resin, such as soft RIM urethane, soft vinyl chloride, soft styrene thermoplastic elastomer or the like. The insert 22 is made of a synthetic resin such as a polyethylene, polyester or polyurethane thermoplastic elastomer or the like; the synthetic resin of the insert 22 being harder than that of the covering layer 21.

The covering layer 21 includes recesses 21b and 21d formed between side wall part 13 and cover part 21a and between side wall part 14 and cover part 21c, respectively. Cover parts 21a and 21c extend so as to form curves at the hinges 17 and 18, respectively. These cover parts 21a and 21c are designed to improve the appearance of the steering wheel.

Figure 2:
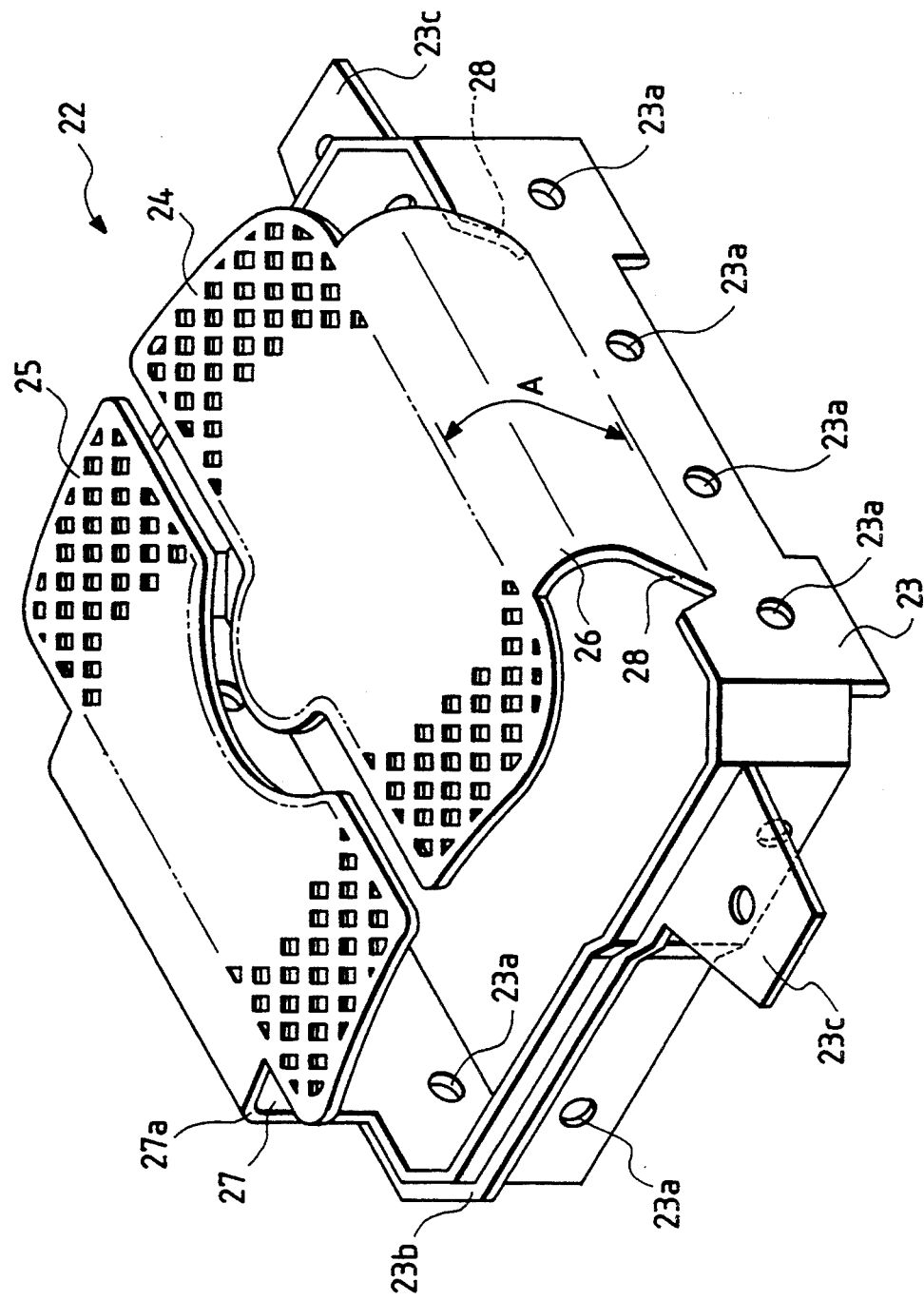
FIG. 2 is a perspective view showing an insert for the pad of the assembly shown in FIG. 1.

As shown in FIGS. 1 and 2, the insert 22 is formed into an integrally molded body including a base part 23, lid parts 24 and 25 and collar parts 26 and 27.

The base part 23 is formed into a substantially rectangular prism positioned at the side wall parts 13, 14, 15 and 16 and has a plurality of mounting holes 23a, as best seen in FIG. 2. These mounting holes 23a are used in mounting the pad 10 onto bag holder 4. The pad 10 is tightened onto the bag holder 4 by the use of mounting rivets 5, which extend through mounting holes 23a, the mounting holes in covering layer 21, and the mounting holes in the side wall 4c of the bag holder 4.

Reference numeral 23b designates a reinforcing rib, and reference numeral 23c designates a support for supporting parts 21e and 21f that protrude rightward and leftward (as seen in FIG. 4) from the covering layer 21 while extending outward from the rib 23b. Reference numerals 29 designate plate-worked stiffening plates used to hold the rivets 5 while they are arranged on the side wall parts 13, 14, 15 and 16. Plates 29 are integrated with the covering layer 21 together with the insert 22 at the time the covering layer 21 of the pad 10 is formed (by molding). The covering layer 21, at portions where the rivets 5 are mounted, has the periphery of the mounting holes 5 in the stiffening plate 29 exposed so that the rivets 5 do not come in contact with the soft covering layer 21.

The lid parts 24 and 25 are designed to be wide and netlike. The lid part 24 is embedded in the front side upper wall part 11f surrounded by the break portion 12, whereas the lid part 25 is embedded in the rear side upper wall part 11b surrounded by the break portion 12.

The collar parts 26 and 27 are embedded in hinges 17 and 18 respectively, and couple the base part 23 with the lid parts 24 and 25, respectively. As shown in FIG. 2, the parts 26 and 27 are designed to be narrower than the lid parts 24 and 25.

As also shown in FIG. 2, the collar part 26, which is coupled between the lid part 24 and base part 23, has peripheral edges 28 cutting downward into the base part 23.

The pad 10 is fabricated by setting the insert 22 and the four stiffening plates 29 in a mold for moldably forming covering layer 21 thereover.

The thus constructed pad 10 is designed so that the front and rear side upper wall parts 11f and 11b will pivotally open about the hinges 17 and 18 after the air bag 1 expands, thereby causing the break portion 12 to break. The break portion breaks along the two dashed lines in FIG. 1, to allow the air bag 1 to be inflated upon an automobile collision.

When air bag 1 is inflated, the collar part 26 of the insert 22 arranged at the hinge 17 is designed to bend outwardly of the pad 10 from the side wall part 13 together with lid part 24 and front side upper wall part 11f. Since collar part 26 has a curved shape and edges 28 which cut downwardly into the base part 23 of insert 22, collar part 26 is able to bend over a relatively large area A (see FIGS. 1 and 2), rather than over a straight bend line. As a result, stress concentrations are dissipated.

Thus, even if the collar part 26 has a relatively large thickness so as to be adequately rigid and strong (1.4 mm in the case of the preferred embodiment) and the bending angles at discrete positions of the collar part 26 are small, a large bending angle of the collar part 26 as a whole, i.e., the sum of the bending angles at such discrete positions, can be ensured. Because of such a large bending angle, the front side upper wall part 11*f* coupled with the collar part 26 of the insert 22 can pivot over an adequately large developing angle to thereby prevent a slowdown of the speed at which the front side upper wall part 11*f* reaches its predetermined finishing position upon opening.

The collar part 27 of the insert 22 is longer than collar part 26. In addition, collar part 27 is not smoothly curved, but rather bends at a relatively sharp angle. As a result, bent part 27*a* is amenable to stress concentration. The rear side upper wall part 11*b* can thus develop smoothly around the bent part 27*a*. Since the rear side upper wall part 11*b* is smaller than rear side upper wall part 11*f*, the air bag 1 hits the underside of rear side upper wall part 11*b* with less impact than front side upper wall part 11*f*. Thus, the rear side upper wall part 11*b* can develop smoothly around the bent part 27*a* without causing unnecessary and unexpected breakage Therefore, even though the pad 10 of the air bag unit M is provided with the embedded synthetic resin-made insert 22, both the front and rear side upper wall parts 11*f*, 11*b* can develop smoothly at the time the air bag 1 is inflated.

Further, since the pad 10 of the embodiment is formed such that the hinge 17 and the collar part 26 are shaped so as to curve outwardly of the pad 10 from the side wall part 13, a space large enough to accommodate the air bag 1 is ensured.

In the above-described embodiment, the covering layer 21 includes the cover parts 21*a* and 21*c* that form recesses 21*b* and 21*d* between themselves and the side wall parts 13, 14, respectively. This enhances the appearance of the pad 10, and provides a space for the covering layer 21 at the hinges 17, 18 and at the cover parts 21*a*, 21*c* to move when the front and rear side upper wall parts 11*f* and 11*b* open. As a result, the opening of the front and rear side upper wall parts 11*f* and 11*b* can be performed smoothly.

Further, recesses 21*g* and 21*h* that are formed by thinning the covering layer 21 are arranged on an extension of the break portion 12 in the vicinity of the collar parts 26 and 27 so that the covering layer 21 at the hinges 17 and 18 give the smallest possible resistance to the development of the front and rear side upper wall parts 11*f*, 11*b*. This further allows the front and rear side upper wall parts 11*f*, 11*b* to develop smoothly.

Still further, while the insert 22 is formed integrally in the above-described embodiment, an insert made of two members may be used. Such insert may be prepared by forming the lid parts 24 and 25 from a net-like cloth, such as polyamide and the like. Such lid parts can then be bonded to the collar parts 26 and 27 by insert-forming at the time the base part 23 and the collar parts 26, 27 of the insert 22 are formed.

Still further, while the collar part 27 has a different shape from collar part 26, the shape of collar part 27 can be made substantially similar to that of collar part 26.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable on skilled in the art to utilize the invention in various embodiments and with various modifications as are suited to the particular use contemplated. It is intended that the scope of the invention be defined by the claims appended hereto, and their equivalents.

What is claimed is:

1. A pad for an air bag comprising:
    an outer covering including an upper wall part, hinge portions disposed at a periphery of the upper wall part, and side wall parts extending from the hinge portions, said outer covering being adapted to substantially confine an air bag when the air bag is in an uninflated condition, said upper wall part being conditionable to permit the airbag to escape the confines of said outer covering in response to an inflation of the air bag; and
    a synthetic resin insert including a base part, collar parts, and lid parts respectively embedded in the side wall parts, the hinge portions, and the upper wall part of the outer covering, said collar parts coupling the base part with the lid parts, said hinge portions and the respective collar parts embedded therein being bendable to permit the air bag to escape the confines of the outer covering when the upper wall part is conditioned in response to the inflation of the air bag, at least one of said collar parts having a smoothly curved configuration extending outwardly from the base part and then inwardly towards a respective lid part, said base part having an upper edge thereof extending inwardly into said base part to form V-shaped notches at opposite sides of said at least one of said collar parts to enable the pad to open smoothly and rapidly when the air bag is inflated.

2. A pad for an air bag according to claim 1, wherein said outer covering comprises a synthetic resin material which is softer than the synthetic resin material of said insert.

3. A pad for an air bag according to claim 1, wherein said outer covering includes cover parts extending outwardly from the vicinity of said hinge portions.

4. A pad for an air bag according to claim 3, wherein recesses are formed between said cover parts and respective ones of said side wall parts.

5. A pad for an air bag according to claim 1, wherein said collar parts are narrower than said lid parts.

6. A pad for an air bag according to claim 1, wherein said outer covering is thinned in the vicinity of the hinge portions.

7. A pad for an air bag according to claim 1, wherein the upper wall part has a break portion which breaks to permit the airbag to escape the confines of said outer covering in response to the inflation of the air bag.

8. A pad for an air bag according to claim 7, wherein the upper wall part is divided into a front side upper wall part and a rear side upper wall part, said break portion defining the division between the front side upper wall part and the rear side upper wall part.

9. A pad for an air bag according to claim 8, wherein the front side upper wall part has a surface area which is larger than that of the rear side upper wall part.

10. The combination comprising:
    a bag holder;
    an air bag secured to the bag holder;
    an inflator for supplying a predetermined amount of gas to the air bag; and
    a pad being cooperable with said bag holder to confine said air bag when the air bag is in an uninflated condition, said pad including an outer covering and a synthetic resin insert embedded in the outer covering, said outer covering having an upper wall part, hinge portions disposed at a periphery of the upper wall part, and side wall parts extending from the hinge portions, said upper wall part being conditionable to permit the airbag to escape the confines of said pad in response to an inflation of the air bag, said synthetic resin insert including a base part, collar parts, and lid parts respectively embedded in the side wall parts, the hinge portions, and the upper wall part of the outer covering, said collar parts coupling the base part with the lid parts, said hinge portions and the respectively embedded collar parts being bendable to permit the air bag to escape the confines of the pad when the upper wall part is conditioned in response to the inflation of the air bag, at least one of said collar parts having a smoothly curved configuration extending outwardly from the base part and then inwardly towards a respective lid part, and said base part having an upper edge thereof extending inwardly into said base part to form V-shaped notches at opposite sides of said at least one of said collar parts to enable the pad to open smoothly and rapidly when the air bag is inflated.

11. The combination according to claim 10, wherein said outer covering comprises a synthetic resin material which is softer than the synthetic resin material of said insert.

12. The combination according to claim 10, wherein said outer covering includes cover parts extending outwardly from the vicinity of said hinge portions.

13. The combination according to claim 12, wherein recesses are formed between said cover parts and respective ones of said side wall parts.

14. The combination according to claim 10, wherein said collar parts are narrower than said lid parts.

15. The combination according to claim 10, wherein said outer covering is thinned in the vicinity of the hinge portions.

16. The combination according to claim 10, wherein the upper wall part has a break portion which breaks to permit the airbag to escape the confines of said outer covering in response to an inflation of the air bag.

17. The combination according to claim 16, wherein the upper wall part is divided into a front side upper wall part and a rear side upper wall part, said break portion defining the division between the front side upper wall part and the rear side upper wall part.

18. The combination for an air bag according to claim 17, wherein the front side upper wall part has a surface area which is larger than that of the rear side upper wall part.

* * * * *